United States Patent
Harada

(10) Patent No.: US 8,305,628 B2
(45) Date of Patent: Nov. 6, 2012

(54) PRINTING MERGED DATA USING AN INVALIDATION PROCESS

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 12/424,522

(22) Filed: Apr. 15, 2009

(65) Prior Publication Data

US 2009/0284767 A1    Nov. 19, 2009

(30) Foreign Application Priority Data

May 16, 2008   (JP) .................... 2008-130094

(51) Int. Cl.
*G06K 15/00*    (2006.01)

(52) U.S. Cl. ........ 358/1.18; 358/1.9; 358/540; 715/200; 715/209; 715/221; 715/224; 715/225; 345/629; 345/635

(58) Field of Classification Search ............ 358/1.1, 358/1.9, 540, 1.15, 1.18; 715/200, 209, 221, 715/224, 225; 345/629, 635
See application file for complete search history.

(56) References Cited

U.S. PATENT DOCUMENTS

| 2005/0225797 | A1 | 10/2005 | Harada |
| 2007/0070441 | A1* | 3/2007 | Yumita .................. 358/450 |
| 2009/0086255 | A1* | 4/2009 | Duong .................. 358/1.15 |

FOREIGN PATENT DOCUMENTS

JP    2004-139465 A    5/2004

* cited by examiner

*Primary Examiner* — King Poon
*Assistant Examiner* — Jamares Q Washington
(74) *Attorney, Agent, or Firm* — Fitzpatrick, Cella, Harper & Scinto

(57) ABSTRACT

A printing apparatus analyzes whether or not each page in form data has been given a designation of blank page printing, carries out a process based on a result of analysis, of invalidating the designation of blank page printing of a page that has been given the designation of blank page printing in the form data, merges form data and print data, and performs printing of merged data that has been obtained by merging.

18 Claims, 13 Drawing Sheets

FIG. 12

| | WATERMARK | PRINT DATA (PDL DATA) | PRINTED RESULT |
|---|---|---|---|
| CONVENTIONAL TECHNIQUE | @ | "BLANK PAGE NO FEE" | |
| PRESENT INVENTION | @ | "BLANK PAGE NO FEE" | |

PRINTING MERGED DATA USING AN INVALIDATION PROCESS

BACKGROUND OF THE INVENTION

1. Field of the Invention

The present invention relates to printing apparatuses, printing methods, and media storing printing programs that print form data merged with print data.

2. Description of the Related Art

With printing apparatuses, conventionally fees are charged regardless of whether or not there is print data on the pages to be printed. That is, a fee is charged even for blank pages, and therefore there is a demand for fees to be charged flexibly in response to the objects to be printed, with various techniques being developed.

For example, in the case where in a printing apparatus there are pages to be printed that are blank, it is common to not charge a fee for the cost of toner or the like by inserting a "blank page no fee" command into the data of those pages. Furthermore, in order to prevent the "blank page no fee" command being inserted intentionally into non-blank pages to avoid fees, immediately prior to print processing after a rendering process, print data may be cleared for pages in which a "blank page no fee" command has been inserted such that a blank page is discharged (Japanese Patent Laid-Open No. 2004-139465).

In generally performed printing techniques there is form merging printing in which print data for merging and form data are merged. Form merging printing such as this is a technique in which data that has been captured by a scanner or stored as PDL data in advance is superimposed and printed as form data with print data. The aforementioned "blank page no fee" commands are held even in the case where printing is to be performed after data being stored once by a document storage function (also referred to as BOX function) of the printing apparatus, for example. Accordingly, multi-page data stored by the document storage function or the like is used as form data to carry out form merging printing. When a "blank page no fee" command is held in either the form data or the print data at this time, the command becomes valid and a blank page is outputted undesirably.

In recent years there has been increasing demand for printing apparatuses capable of supporting multi-page form data. In the case where the form data is multi-page, it is common that rather than generating all the form data, a user will generate form data by reusing and processing existing data for example. Here, it is conceivable that the aforementioned "blank page no fee" command is already inserted in any of the pages of the form data. If a "blank page no fee" command is inserted in a page that is of no concern to the user, a blank page will be undesirably output according to the original function of the "blank page no fee" command.

Generally, for a user to investigate whether or not a "blank page no fee" command has been inserted in data, it is necessary for that user to be familiar with PDL language for example. Consequently, it may be difficult for a user to delete "blank page no fee" commands when necessary.

Furthermore, there have been various methods in form merging printing in recent years, and representative examples of such methods that can be put forth include a method in which form data is printed on preprinted sheets that have been printed on in advance, and a method in which toner for print data and toner for form data are printed in a one-time operation. Also, in recent years, printing apparatuses have become common that combine these methods. Further still, form merging printing can also be used in, for example, a case where form data to be used indiscriminately for all pages such as a watermark is merged with print data for printing.

Accordingly, it is desirable that the application of blank page commands is flexible as desired by the user in form merging printing in which various functions are combined.

SUMMARY OF THE INVENTION

The present invention provides a printing apparatus that is capable of outputting a desired printing result by appropriately processing designations of blank pages in form merging printing.

The present invention in its first aspect provides a printing apparatus that prints merged data in which print data and form data have been merged, comprising: an analysis unit configured to analyze whether or not each page in the form data has been given a designation of blank page printing, a processing unit configured to carry out a process, based on a result of analysis by the analysis unit, of invalidating the designation of blank page printing of a page that has been given the designation of blank page printing in the form data, a merging unit configured to merge the form data processed by the processing unit and the print data, and a print unit configured to perform printing of the merged data that has been obtained by the merging unit.

The present invention in its second aspect provides a printing method executed in a printing apparatus that prints merged data in which print data and form data have been merged, comprising the steps of: analyzing whether or not each page in the form data has been given a designation of blank page printing, carrying out a process, based on a result of analysis in the analysis step, of invalidating the designation of blank page printing of a page that has been given the designation of blank page printing in the form data, merging the form data processed in the processing step and the print data, and performing printing of the merged data that has been obtained in the merging step.

The present invention in its third aspect provides a computer-readable medium on which is stored a printing program executed in a printing apparatus for printing merged data in which print data and form data have been merged, the program causing a computer to function so as to: analyze whether or not each page in the form data has been given a designation of blank page printing, carry out a process, based on a result of the analysis, of invalidating the designation of blank page printing of a page that has been given the designation of blank page printing in the form data, merge the form data that has undergone the process and the print data, and print merged data that has been obtained by the merging.

With the present invention it is possible to output a desired printing result by appropriately processing designations of blank pages giving consideration to an intention of the user in form merging printing.

Further features of the present invention will become apparent from the following description of exemplary embodiments with reference to the attached drawings.

BRIEF DESCRIPTION OF THE DRAWINGS

FIG. 12 is a diagram for describing a result according to the second embodiment.

DESCRIPTION OF THE EMBODIMENTS

Hereinafter, preferred embodiments for executing the present invention are described in detail while referencing the accompanying drawings. It should be noted that same reference numbers are assigned to same configuration elements and description thereof is omitted.

First Embodiment

A description is given of the first embodiment regarding a case in which the "blank page no fee" command is present in form data other than a watermark. It should be noted in regard to the printing of form data in the present invention that it can also be applied in the case where printing for a special application is intended such as clear toner or the like which, unlike ordinary toner, gives a glossy feel to printed materials that have undergone color printing.

Figure 1:
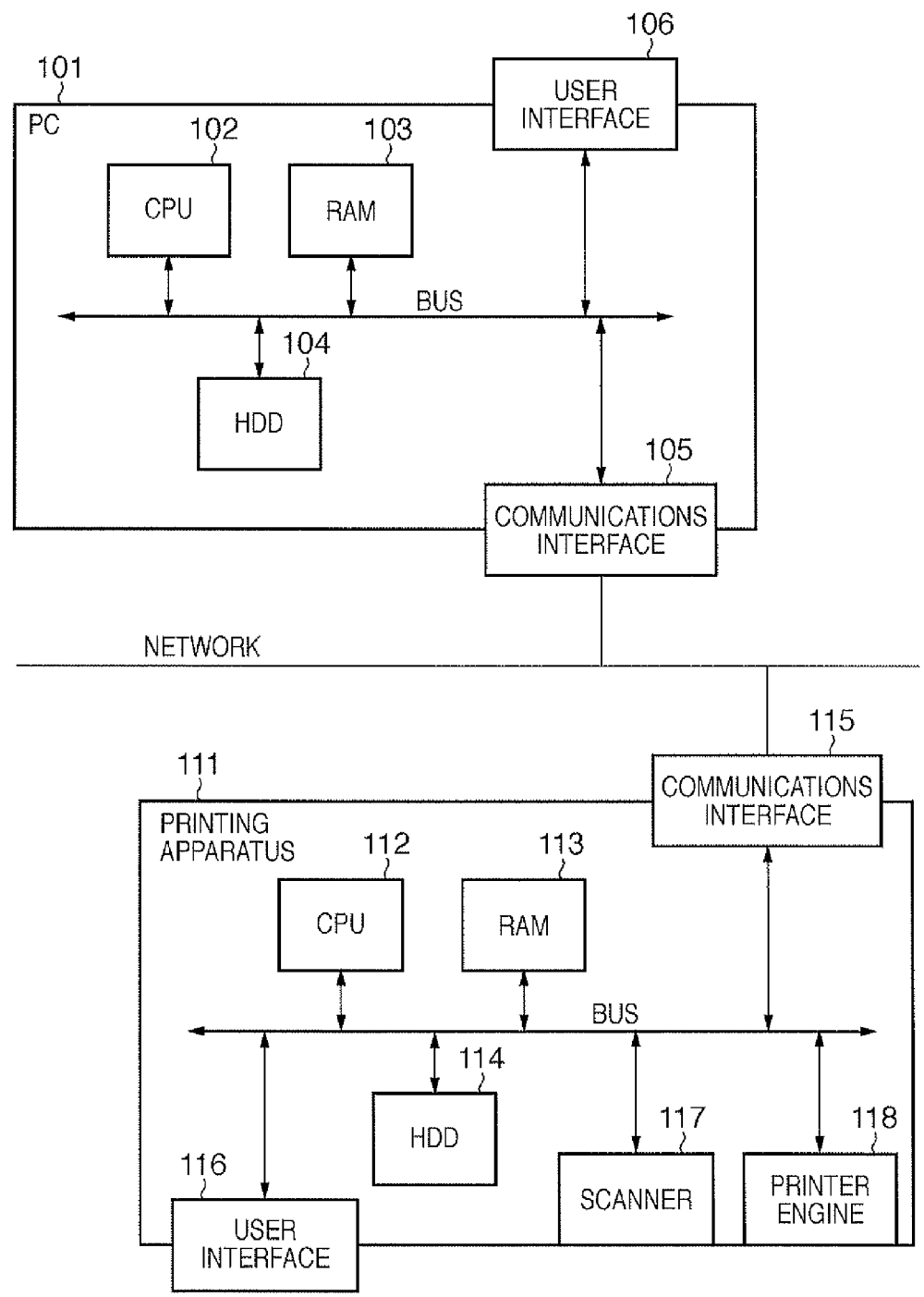
FIG. 1 is a diagram showing a configuration of a system including a printing apparatus according to an embodiment of the present invention.

FIG. 1 is a diagram showing a configuration of a system including a printing apparatus according to an embodiment of the present invention. Software that is to be described in FIG. 2 onward can be run using a CPU 102 contained in a PC 101. A RAM 103 is used in such cases as when the software being run by the CPU 102 stores data. A HDD 104 is a hard disk that stores software and the like. The PC 101 can execute communications with a printing apparatus 111 through a communications interface 105. Furthermore, a user can carry out operations and can display operation results of the software using a user interface 106. The aforementioned blocks in the PC 101 are connected by a bus and are capable of exchanging data with each other.

The printing apparatus 111 is a multifunction peripheral (MFP) in which a printing function, a fax function, and scanner functions or the like are combined. Furthermore, the printing apparatus 111 is capable of executing communications with the PC 101 through a network. Software that is to be described in FIG. 2 onward can be run using a CPU 112 contained in the printing apparatus 111. A RAM 113 is used in such cases as when the software being run by the CPU 112 stores data. A HDD 114 is a hard disk that stores software and the like. The printing apparatus 111 can execute communications with the PC 101 through a communications interface 115. Furthermore, the user can carry out operations and can display operation results of the software using a user interface 116. The printing apparatus 111 includes a scanner 117 and includes a printer engine 118. The above-described blocks in the printing apparatus 111 are connected by a bus and are capable of exchanging data with each other.

Figure 2:
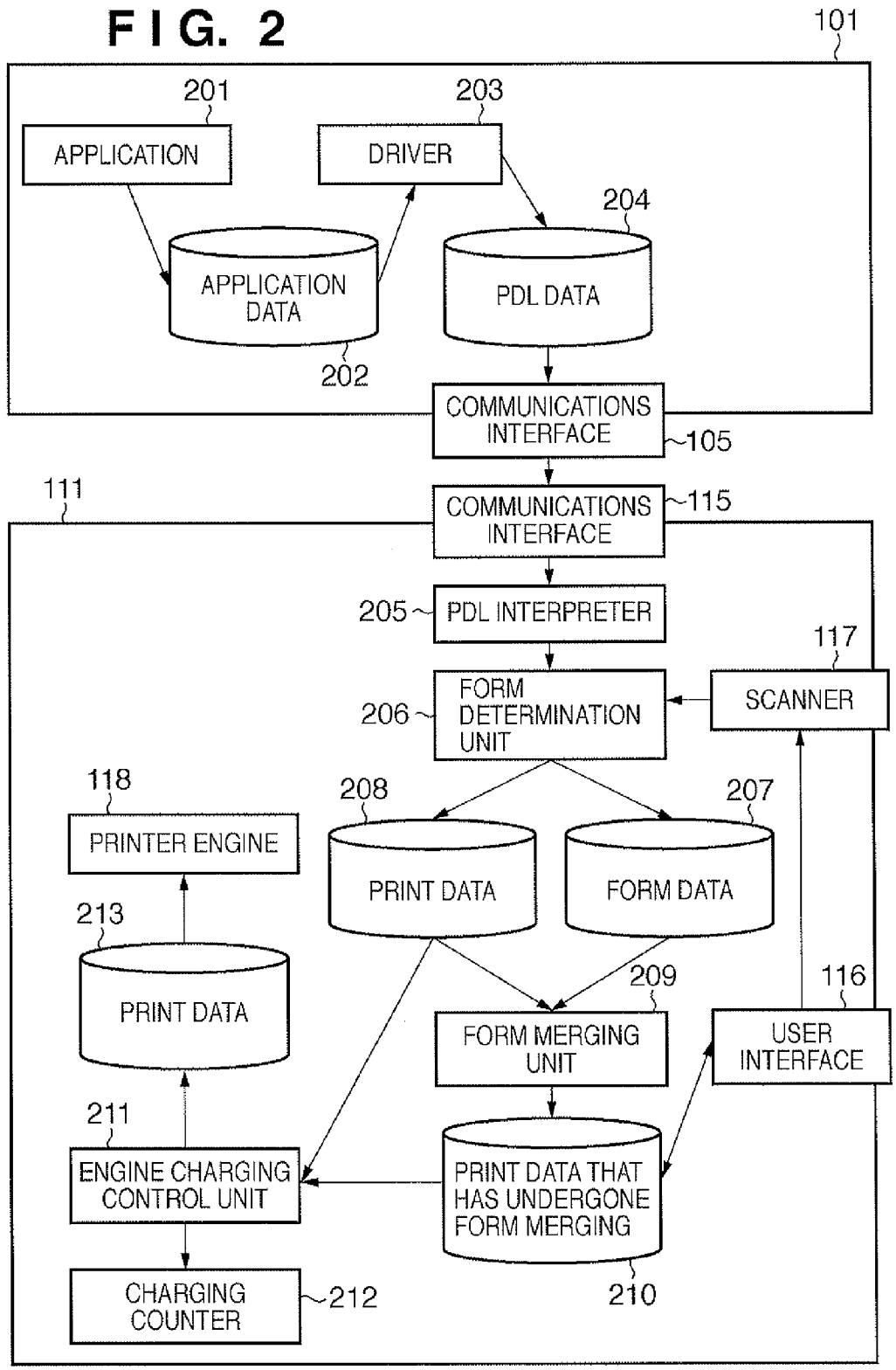
FIG. 2 is a diagram showing a software module configuration according to the present embodiment.

FIG. 2 is a diagram showing a software module configuration according to the present embodiment. A portion of the hardware configuration in FIG. 1 is shown in FIG. 2 for the purpose of description. An application 201 is run by the CPU 102. Application data 202 is data generated by the application 201 and is saved in a storage area such as the RAM 103 and the HDD 104 or the like. A driver 203, which is a printer driver, converts the application data 202 into a format that can be understood and printed by the printing apparatus 111. The driver 203 is run by the CPU 102. PDL data 204 is PDL data generated by the driver 203 and is saved in a storage area such as the RAM 103 and the HDD 104 or the like. Here, PDL is an abbreviation of "page description language," which signifies a generally used page description language.

A PDL interpreter 205 interprets the PDL data 204. A form determination unit 206 determines whether PDL data interpreted by the PDL interpreter 205 or scanned data read in from the scanner 117 is data that is registered as form data in storage unit 207 or whether it is ordinary print data in storage unit 208. As a result of these respective determinations, the data is stored in the storage unit 207 or the storage unit 208. In the case where a form merging instruction is present in the print data of the storage unit 208, a form merging unit 209 carries out a merging process with the form data of the storage unit 207 to generate print data that has undergone form merging and stores this in a storage unit 210.

When print data or print data that has undergone form merging is to be printed, a charging control unit 211 determines whether or not a "blank page no fee" command is present in the pages. In the case where a "blank page no fee" command has been set in the page data, the charging control unit 211 does not increase a charging counter 212 but generates "blank page no fee" command processed print data in which the image data of the relevant page is cleared (deleted) and issues a print command to the printer engine 118. By clearing the image data in this manner, the printing of image data for no fee is avoided. On the other hand, in the case where a "blank page no fee" command has not been set in the page data, the charging control unit 211 increases the charging counter 212 and issues a print command to the printer engine 118 so that printing is performed of the print data as it is.

In the software module configuration of the printing apparatus 111 shown in FIG. 2, the PDL interpreter 205, the form determination unit 206, the form merging unit 209, the charging control unit 211, and the charging counter 212 may be realized by the CPU 112 shown in FIG. 1.

Hereinafter, with reference to FIG. 3 to FIGS. 6A and 6B, description is given regarding a process according to the present embodiment in which form data and print data are merged into PDL data in the PC 101 and sent to the printing apparatus 111 for printing.

Figure 3:
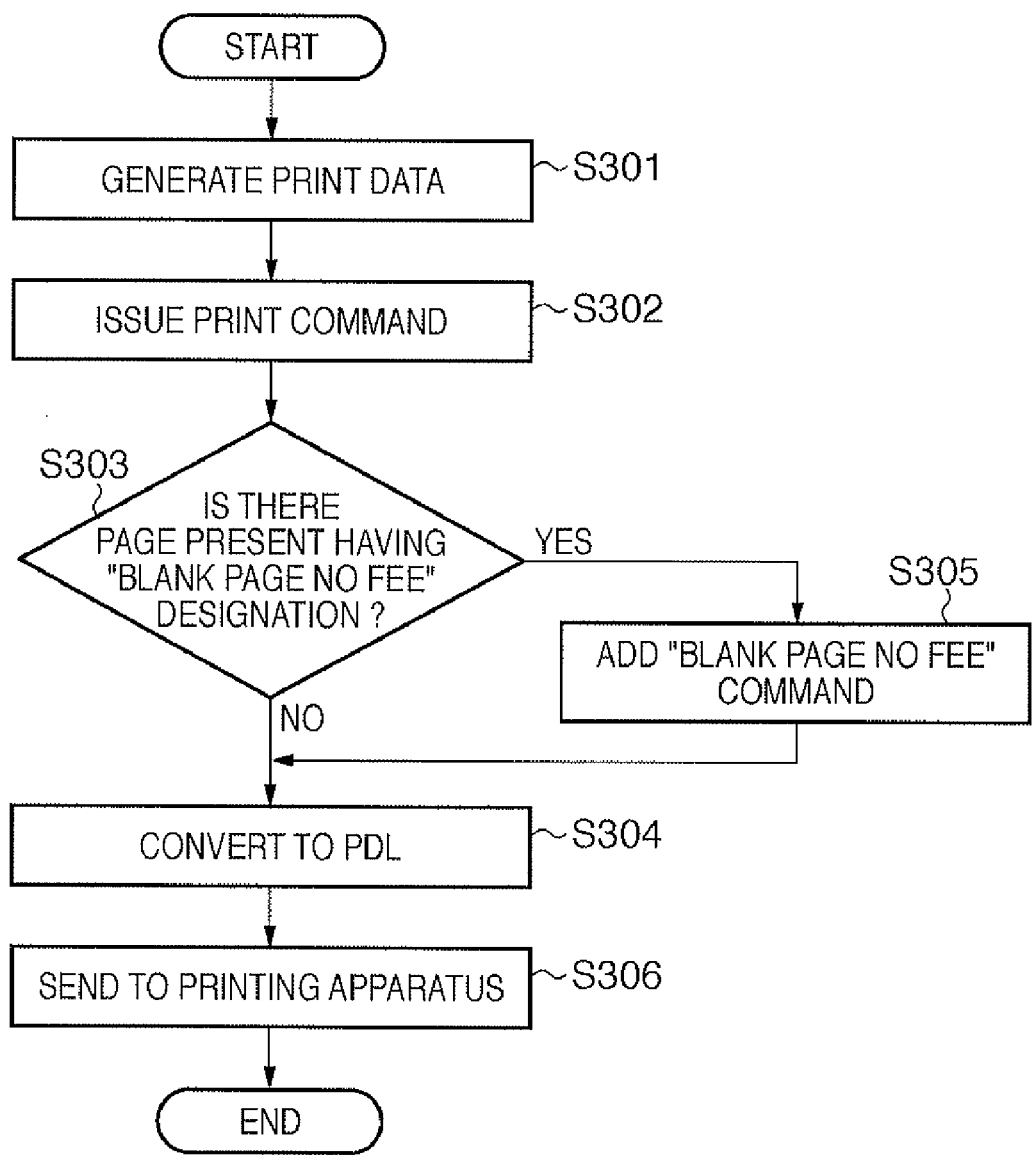
FIG. 3 is a flowchart showing a procedure of a process of carrying out printing from a PC.

FIG. 3 is a flowchart showing a procedure of a process of carrying out printing from the PC 101. First, in step S301, the user uses the application 201 to generate the application data 202 that is desired to be printed. There are cases where a designation of "blank page no fee" is made for a specific page in the application data 202 by the user through the application. Next, in step S302, a print command of the application data 202 is issued from the application based on a print instruction of the user, and the driver is launched. The driver 203 analyzes the application data 202 in a step of a later stage.

In step S303, the driver 203 determines whether or not a page is present in the application data 202 having a designation of "blank page no fee." Here, when it is determined that a page is present having a designation of "blank page no fee,"

a "blank page no fee" command is added to the relevant page data in step S305, and the procedure proceeds to step S304. On the other hand, in the case where it is determined that no page is present having a designation of "blank page no fee," the procedure proceeds to step S304. The determination of step S303 may be determined according to whether or not a "blank page no fee" flag is on or off by referencing information that has been added to the page, for example, attribute information of the page. In step S304, the driver 203 converts the application data 202 to PDL data 204, which is a print job, and in step S306, this is sent to the printing apparatus 111.

Figure 4:
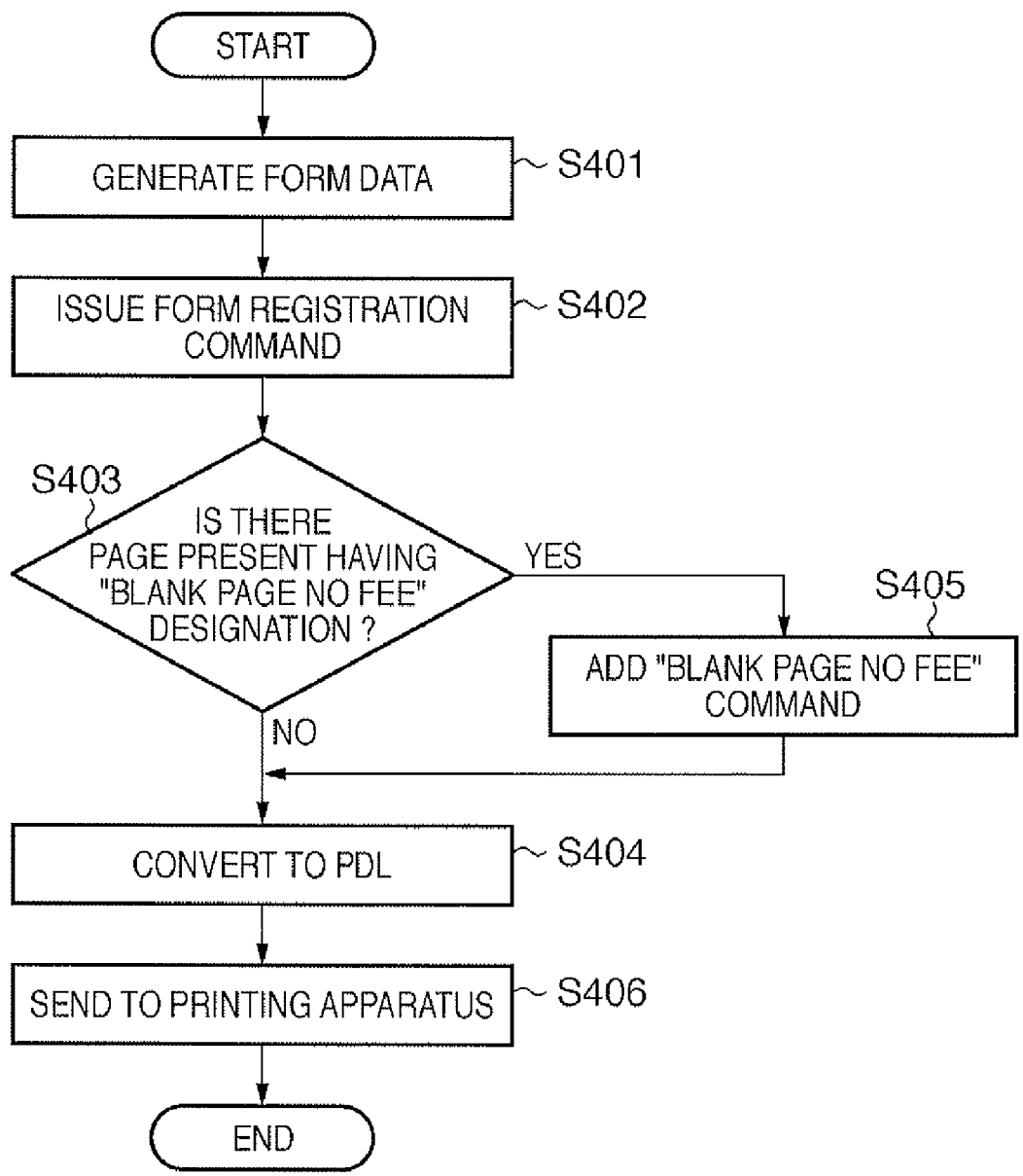
FIG. 4 is a flowchart showing a procedure of a process of carrying out registration of form data from a PC.

FIG. 4 is a flowchart showing a procedure of a process of carrying out registration of form data from the PC 101.

First, in step S401, the application data 202 that is desired as form data is generated by the application 201. Here, form identifying information can be specified at the same time as the generation of the application data 202. Next, in step S402, a form registration command is issued of the application data 202 that has been generated. When the form registration command is issued from the application, the driver 203 is launched and analyzes the application data 202 in a step of a later stage. In step S403, a determination is performed as to whether or not a page is present in the application data 202 having a designation of "blank page no fee." Here, when it is determined that a page is present having a designation of "blank page no fee," a "blank page no fee" command is added to the relevant page in step S405, and the procedure proceeds to step S404. On the other hand, in the case where it is determined that no page is present having a designation of "blank page no fee," the procedure proceeds to step S404. The determination of step S403 may be determined according to whether or not a "blank page no fee" flag is on or off by referencing information that has been added to the page, for example, attribute information of the page. In step S404, the application data 202 desired as form data is converted to PDL data 204 and, in step S406, this is sent to the printing apparatus 111. It should be noted that it is also possible to generate ordinary application data for printing using an application, then issue a form registration command by the driver, generate PDL data and form identifying information, and register this as form data in the printing apparatus.

Figure 5:
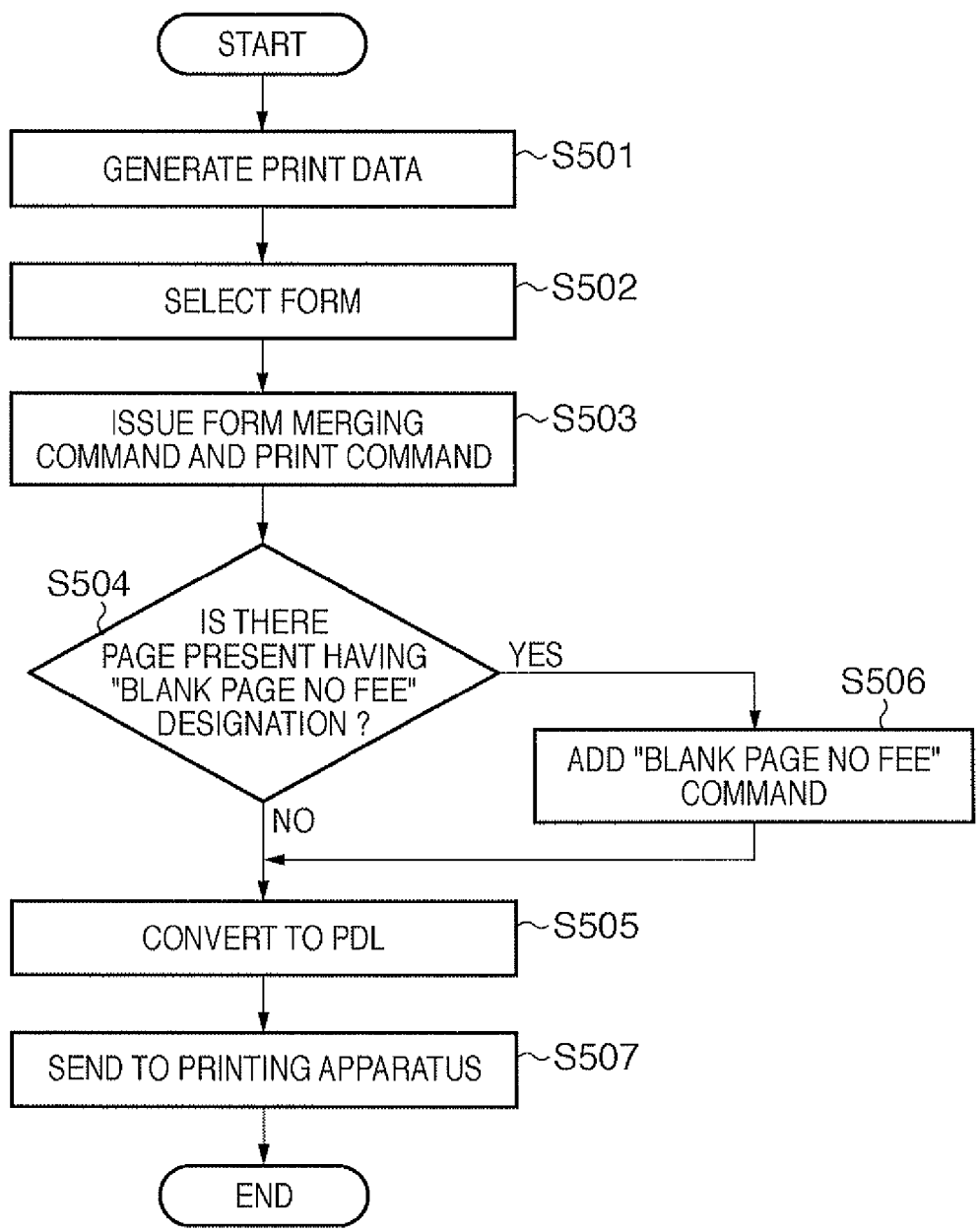
FIG. 5 is a flowchart showing a procedure of a process of carrying out form merging printing from a PC.

FIG. 5 is a flowchart showing a procedure of a process of specifying form data and data for merging from the PC 101 and carrying out form merging printing.

First, in step S501, the user uses the application 201 to generate the application data 202 that is desired to be printed. Next, in step S502, form data that is to undergo for form merging is selected using the application 201 or the like and, in step S503, a form merging command and a print command are issued. Here, for example, the form data is selected using form identifying information or the like. The driver 203 is launched based on the form merging command and the print command. In step S504, a determination is performed as to whether or not a page is present in the application data 202 having a designation of "blank page no fee." Here, when it is determined that a page is present having a designation of "blank page no fee," a "blank page no fee" command is added to the relevant page in step S506, and the procedure proceeds to step S505. On the other hand, in the case where it is determined that no page is present having a designation of "blank page no fee," the procedure proceeds to step S505. The determination of step S504 may be determined according to whether or not a "blank page no fee" flag is on or off by referencing information that has been added to the page, for example, attribute information of the page. In step S505, the application data 202 is converted to PDL data 204 and, in step S507, the selected form identifying information and PDL data are sent to the printing apparatus 111. Here, PDL data as the form data and PDL data for merging can be sent to the printing apparatus at the same time.

The above-described FIG. 3 to FIG. 5 show processes in the PC 101 in which data is converted to PDL and the PDL data is sent to the printing apparatus 111. Hereinafter, description is given using FIGS. 6A and 6B regarding a procedure of a process showing a characteristic of the present embodiment.

Figure 6A:
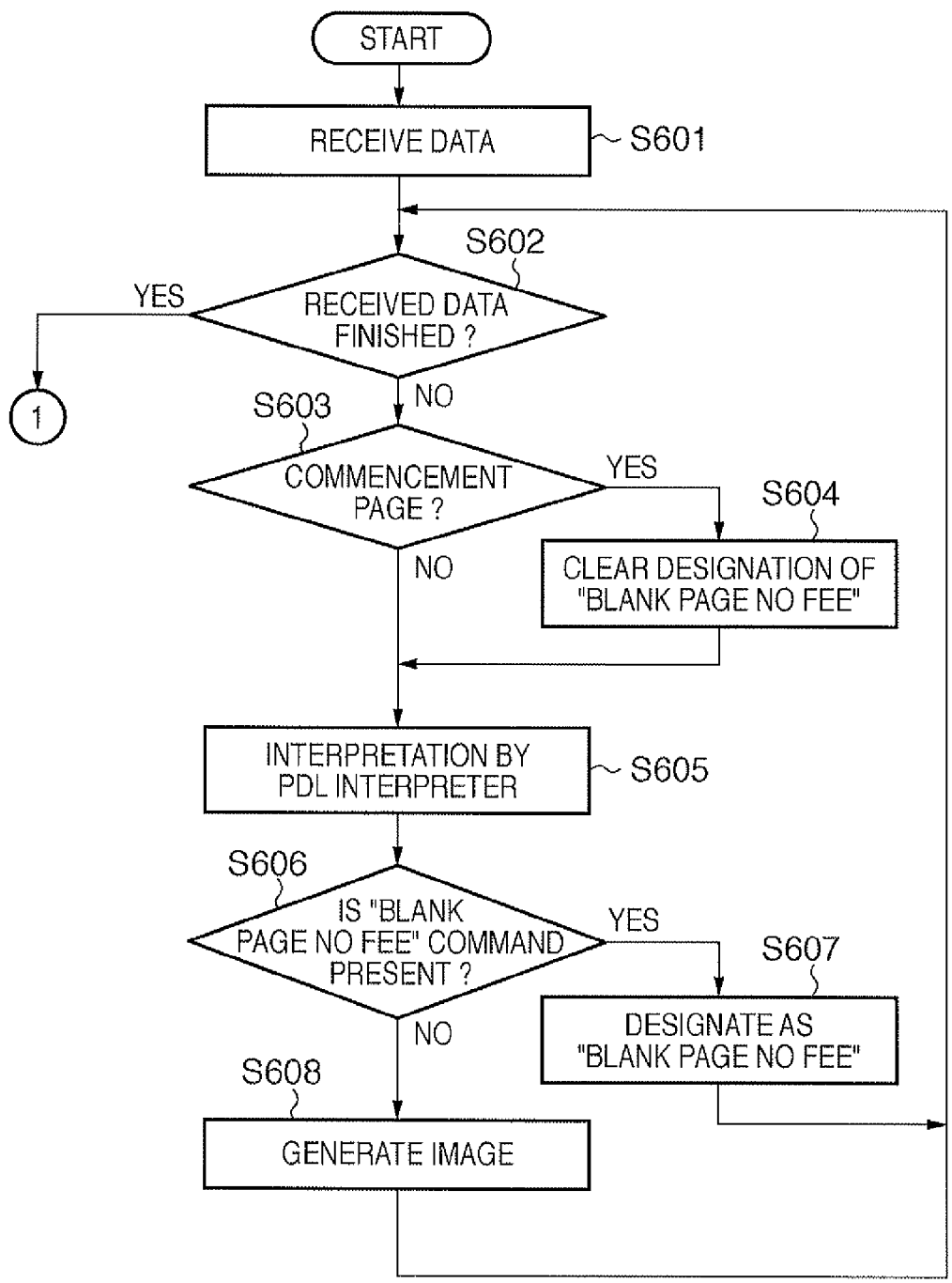
FIGS. 6A and 6B are flowcharts showing a procedure of a process of a printing apparatus in the case where form merging data has been sent from a PC according to the present embodiment.
Figure 6B:
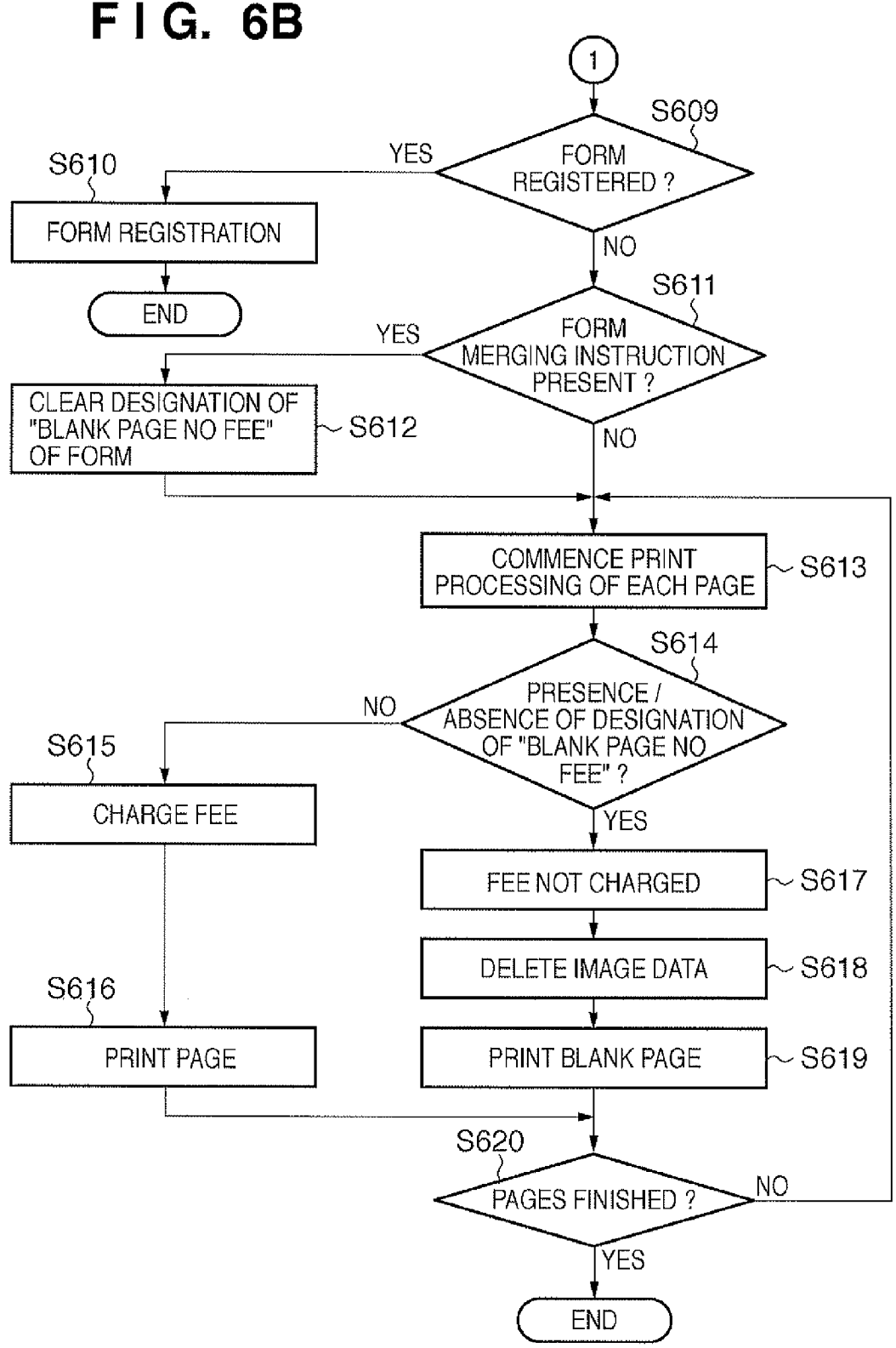

FIGS. 6A and 6B are flowcharts showing a procedure of a process of a printing apparatus in the case where PDL data is received from the PC 101 according to the present embodiment.

First, in step S601, the PDL interpreter 205 receives the PDL data via the communications interface 115. In step S602, the PDL interpreter 205 determines whether or not interpreting of all the received PDL data has finished. Here, when it is determined that all the data has been interpreted, the procedure proceeds to step S609 and when it is determined that all the data has not been interpreted, the procedure proceeds to step S603.

Next, in step S603, a determination is performed as to whether or not it is the commencement of a page in the received PDL data. Here, when it is determined that it is a commencement page, then the designation of a blank page due to the "blank page no fee" command of the page is cleared in step S604, and the procedure proceeds to step S605. It should be noted that here it is also possible for the "blank page no fee" flag to be turned off. On the other hand, in the case where it is determined that it is not a commencement page, then the procedure proceeds to step S605 and the PDL interpreter 205 carries out interpretation of the received PDL data.

Next, as a result of the interpretation, a determination is performed in step S606 as to the presence/absence of a "blank page no fee" command. Here, when it is determined that a "blank page no fee" command is present, designation of "blank page no fee" is carried out for that page in step S607, then the procedure returns to step S602. On the other hand, when it is determined that a "blank page no fee" command is absent, generation of image data for rendering (rasterizing) is carried out in accordance with the PDL commands in step S608, then the procedure returns to step S602.

With the processing of steps S601 to S608, the PDL data received from the PC 101 is interpreted and print data is generated containing at least data in which a "blank page no fee" designation has been made or image data.

Next, in step S609, the form determination unit 206 determines whether or not the received data is data to be registered as a form. For example, this may be determined by referencing whether or not a form registration command is inserted as a PDL command as shown in FIG. 4. Here, when it is determined that it is data to be registered as a form, the aforementioned print data is registered as form data in step S610 in a storage area, and the present process finishes. On the other hand, when it is determined that it is not data to be registered as form data, a determination is performed in step S611 as to whether or not it is data in which a form merging instruction has been performed. For example, this may be determined by referencing whether or not a form merging command is inserted as a PDL command as shown in FIG. 5.

When it is determined in step S611 that it is data having a form merging instruction, form data specified by the form identifying information is extracted in step S612. Further still, in step S612, the form merging unit 209 clears (deletes) the designation of "blank page no fee" that is added to the form data. After this, form data from which the designation of "blank page no fee" has been cleared is merged with the print data. On the other hand, when it is determined in step S611 that it is not data in which a form merging instruction has been performed, the procedure proceeds to step S613. Hereinafter, data that has undergone the processing of step S612 is referred to as "print data that has undergone form merging" and data that has not undergone the processing of step S612, that is, data for which a determination of "no" has been made in step S611, is referred to as "print data."

In step S613, the charging control unit 211 commences print processing of each page with regard to the print data or the print data that has undergone form merging. In step S614, a determination is performed as to the presence/absence of a "blank page no fee" designation in the pages of the print data. Here, when it is determined that there is no designation of "blank page no fee," the charging counter 212 is instructed to increase in step S615. After this, in step S616, the print data or the print data that has undergone form merging is printed by the printer engine 118. Print data to be printed by the printer engine 118, which is either of the aforementioned sets of print data, is stored in a storage unit shown in FIG. 2 as a storage unit 213. On the other hand, when it is determined that a designation of "blank page no fee" is present, the charging counter 212 is not instructed to increase in step S617. Further still, in step S618, the print data or the print data that has undergone form merging of that page is cleared. Next, in step S619, page data that will be for blank pages when printed is generated and printing is carried out by the printer engine 118 using that data. In step S619, it is also sufficient that a process of only transporting the paper is performed for example.

In step S620, a determination is performed as to whether or not all the pages in the print data or the print data that has undergone form merging have been processed, and when it is determined that all the pages have not been processed, the procedure returns to step S613. On the other hand, when it is determined that all the pages have been processed, the present process finishes.

In FIG. 3 to FIGS. 6A and 6B, description has been given regarding processing in the printing apparatus 111 relating to form merging printing or the like based on a presence/absence of a "blank page no fee" command setting. In form merging printing, in addition to a method in which form data and data for merging are merged, there is a method in which form data is merged with already printed preprinted sheets. In this method of form merging printing, the presence/absence of "blank page no fee" being designated in the form data does not affect the image on the preprinted sheets. Accordingly, in the method of form merging printing using preprinted sheets, there is no particular need to clear any "blank page no fee" designation which is set in form data.

Figure 7:
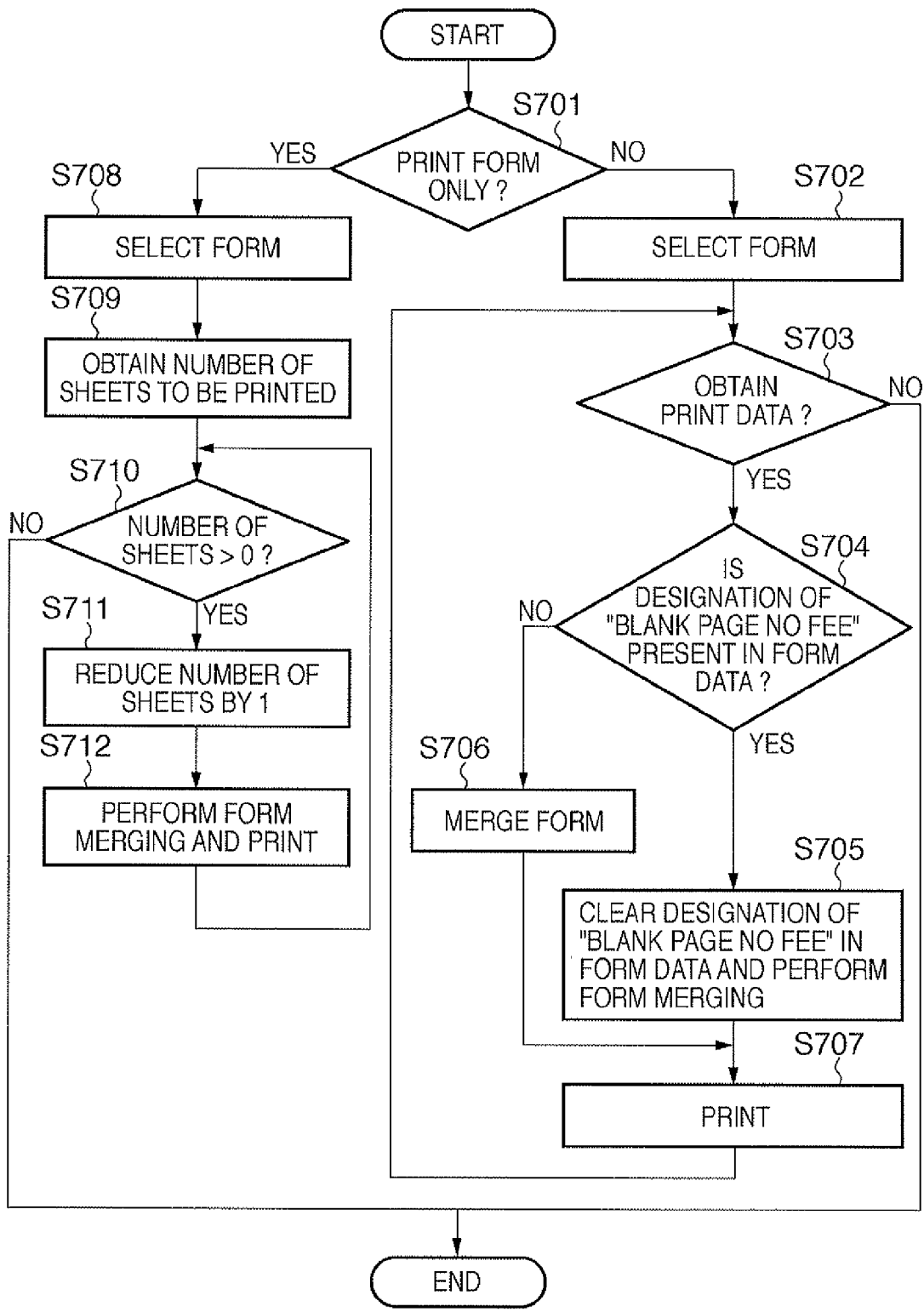
FIG. 7 is a flowchart showing a procedure of a process of the printing apparatus in the case where form merging printing is carried out using a user interface.

Next, FIG. 7 is a flowchart showing a procedure of a process of the printing apparatus in the case where form merging printing or the like is carried out using the user interface.

First, in step S701, a determination is performed as to whether it is form merging printing for print data that has been read in from the scanner or print data stored in the BOX, or whether it is form merging printing using only form data for preprinted sheets. Step S701 may be determined for example by which of the former type of form merging printing or the latter type of form merging printing the user has selected on the screen of the user interface.

Here, when it is determined that it is form merging printing for print data that has been read in from the scanner or print data stored in the BOX, form data is selected in step S702. Here, for example, the form data is selected by specifying the form identifying information or the like. Next, in step S703, the print data for merging is obtained. For example, an original is set in the scanner and a scanning operation commences. Furthermore, if print data stored in the BOX is being used, the storage location is specified and the print data to be printed is obtained. In the steps hereinafter, the processing of steps S704 to S707 are carried out until there are no more pages to be printed.

In step S704, a determination is performed as to the presence/absence of a "blank page no fee" designation in the print target pages of form data to be merged with the target pages of the print data for merging. Here, when it is determined that a designation of "blank page no fee" is present, the designation of "blank page no fee" of the form is cleared in step S705 and form merging is carried out, then the procedure proceeds to step S707. On the other hand, when it is determined that a designation of "blank page no fee" is absent, form merging is carried out as it is in step S706, then the procedure proceeds to step S707.

In step S707, the print processing indicated in steps S614 to S620 in FIG. 6B is carried out, then the procedure returns to step S703. In step S703, when form merging printing of the number of scanned sheets finishes or when printing of the number of sheets of specified BOX data finishes, the present processing finishes. Here, since the designations of "blank page no fee" in the form data are cleared, fees are charged for the number of printed sheets that occurred in printing.

A description is given returning again to step S701. In step S701, in the case where form merging printing is to be carried out using only the form data for the preprinted sheets, the procedure proceeds to step S708 and the form data to be printed is selected. Here, for example, the form data is selected by specifying the form identifying information or the like. Next, in step S709, a number of pages of desired preprinted sheets for carrying out printing is specified by the user and the number of printed sheets is obtained. Generally, cases are common in which the number of pages of the form data matches the number of preprinted sheets, and therefore here description is given of a case in which the number of preprinted sheets is specified.

In step S710, a determination is performed as to whether or not the number of sheets specified in step S709 is larger than zero. Next, in step S711, the number of sheets specified in step S709 is reduced by "1" and the procedure proceeds to step S712. In step S712, when a designation of "blank page no fee" is present in any of the pages of the form data, form merging is carried out without clearing those designations and print processing is carried out. Here, naturally, printing is carried out without increasing the charging counter 212 when a designation of "blank page no fee" was present. This indicates a case where page data in which image data was cleared undergoes form merging printing. Furthermore, the charging counter 212 is increased and form merging printing is carried out when a designation of "blank page no fee" is not present. After step S712, the procedure returns to step S710, and when it is determined that the number of sheets is zero, the present processing finishes.

In the above description, in carrying out form merging printing, it is also possible that the number of sheets of scanned print data or print data stored in the BOX is different from the number of pages of form data. Furthermore, form merging may be carried out by repetitively using a specified page of form data. Furthermore, it is also possible to send the pages of form data in order and perform form merging using the form of the first page at a point in time when the pages have come to an end, and it is also possible not carry out form merging after the pages have come to an end. Furthermore, in regard to methods of specifying a form, this may be achieved by any technique in the present embodiment.

A description was given in the above-described example of a case in which a designation of "blank page no fee" was not present in the print data stored in the BOX, but cases are conceivable in which the user intentionally leaves designations of "blank page no fee" in the print data stored in the BOX. In this case, in performing form merging printing in step S707, priority may be given to the designation of "blank page no fee" in the print data stored in the BOX, and blank pages may be discharged without a fee being charged.

Figure 8:
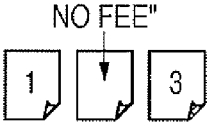
FIG. 8 is a diagram for describing a result according to a first embodiment.

FIG. 8 is a diagram for describing a result according to the present embodiment. As shown in FIG. 8, a conventional case is shown at the upper level, which is compared to a case at the lower level in which the present embodiment is applied.

Here, a form data column shows form data that is registered in the PDL data from the PC 101 or registered by the scanner. Furthermore, for example, when data is registered by the scanner, there is no designation of "blank page no fee." Furthermore, a print data column shows print data for merging that is to be merged with form data, and indicates print data such as print data generated based on the PDL data, print data that has been read in from the scanner 117, and print data that has been specified from the BOX. In FIG. 8, data for rendering is given as print data, with "1" for the first page, "2" for the second page, and "3" for the third page. A printed result column shows results of merging and printing for each page the form data shown in the form data column on the print data shown in the print data column.

The "blank page no fee" shown in FIG. 8 indicates that a designation of "blank page no fee" has been made on the page to which it is added. Case 1 shown in FIG. 8 shows a case in which only print data is printed. Case 2 and case 3 are cases where print data and form data undergo form merging. With conventional techniques, when there is a page for which a designation of "blank page no fee" has been made in either the form data or the print data, that page will be printed as "blank page no fee" as a printing result.

In the present invention, it is evident that in case 2 the printing result is the same as in conventional techniques. This is because in the present invention, consideration is given to the concept that designations of print data clearly input by the user are to be given priority. Consequently, naturally, in case 3 the designation of "blank page no fee" is valid for the second page of the form data. However, in the present invention, the designation of "blank page no fee" for the second page of the form data is invalidated (cleared), and the print data for merging of "2" is print output as a print result.

Further still, in case 4, a case is shown in which merged printing of form data is carried out on preprinted sheets. In this case, the print data has become "none." As previously described in step S712 in FIG. 7, in case 4, the designation of "blank page no fee" of the form data is not cleared (invalidated). This is done so that fees are not charged when performing merged printing of blank pages that originate in a "blank page no fee" command contained in the form data. Here, since preprinted sheets are being used on which images have already been printed, there is no effect on the final output even when a designation of "blank page no fee" of the form data remains.

In the present embodiment, the presence/absence of designations of "blank page no fee" (designations of printing blank pages) is analyzed in response to each case as shown in FIG. 8 when performing form merging printing, and processing can be carried out appropriately giving consideration to the intention of the user, which makes it possible to output a desired printing result.

Second Embodiment

Next, description is given of a case where a function is added of carrying out form merging printing using form data to be added indiscriminately to all pages such as a watermark (digital watermark information).

Figure 9:
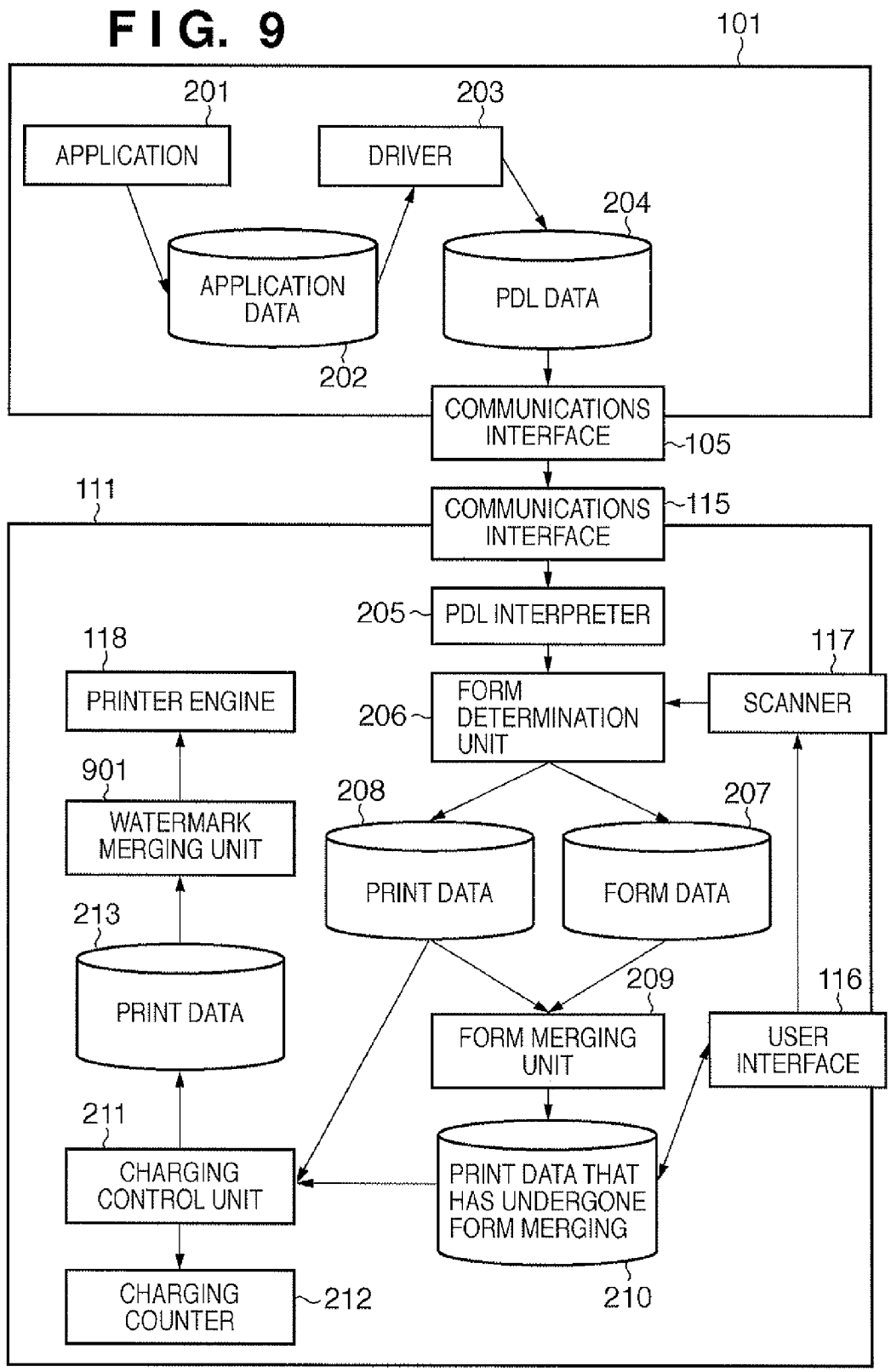
FIG. 9 is a diagram showing a software module configuration according to a second embodiment.

FIG. 9 is a diagram showing a software module configuration according to a second embodiment. The configuration shown in FIG. 9 is different from FIG. 2 in that a watermark merging unit 901 is added for carrying out watermark merging. Furthermore, form data for watermarking is stored in the storage unit 207. This form data may be data generated by an application of an external PC or may be data read in by a scanner and registered, and has identifying information as an attribute in the same manner as the form data.

Figure 10:
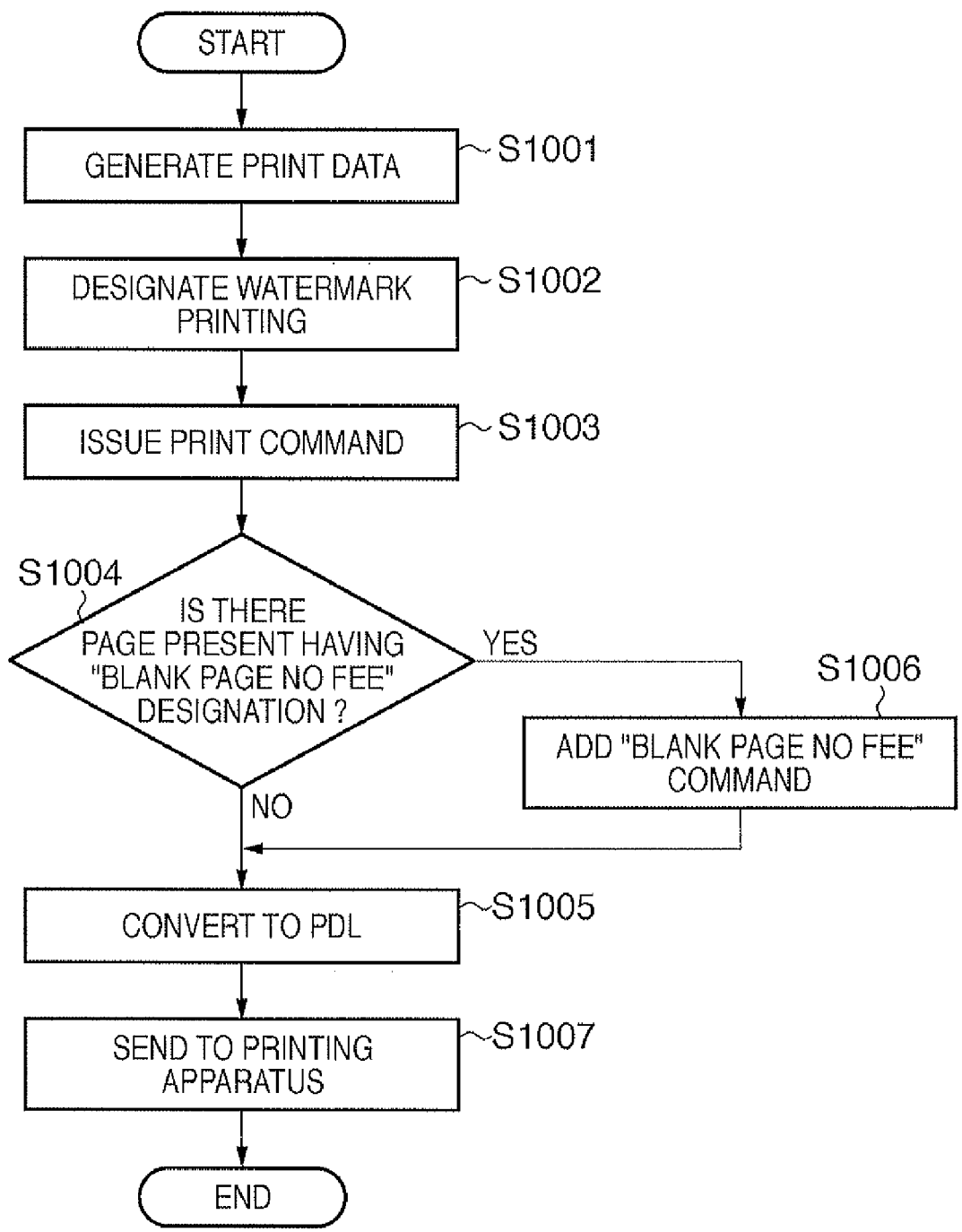
FIG. 10 is a flowchart showing a procedure of a process of carrying out watermark printing from a PC.

FIG. 10 is a flowchart showing a procedure of a process of carrying out watermark printing from the PC 101.

First, in step S1001, based on a user instruction, the application data 202 that is desired to be printed is generated using the application 201. In step S1002, watermark printing is designated according to the application 201 and, in step S1003, a print command is issued. Here, form identifying information is specified at the same time as when watermark printing is designated. When the print command is issued, the driver 203 is launched and analyzes the application data in a step of a later stage.

Next, in step S1004, a determination is performed as to whether or not a page is present in the application data 202 having a designation of "blank page no fee." Here, when it is determined that a page is present having a designation of "blank page no fee," a "blank page no fee" command is added to the relevant page in step S1006, and the procedure proceeds to step S1005. On the other hand, in the case where it is determined that no page is present having a designation of "blank page no fee," the procedure proceeds to step S1005. The determination of step S1004 may be determined according to whether or not a "blank page no fee" flag is on or off by referencing information that has been added to the page, for example, attribute information of the page. In step S1005, the application data is converted to PDL data and, in step S1007, this is sent to the printing apparatus 111 together with the form identifying information. It should be noted that it is also possible for data held in the PC 101 to be converted to PDL data by the driver as the form data and sent to the printing apparatus 111. Furthermore, together with the data for merging, form data for watermarking may be generated as application data in the application then sent to the printing apparatus 111 after being converted to PDL data by the driver. Furthermore, implementations are possible in which the designation of watermark printing is carried out from the driver.

Figure 11:
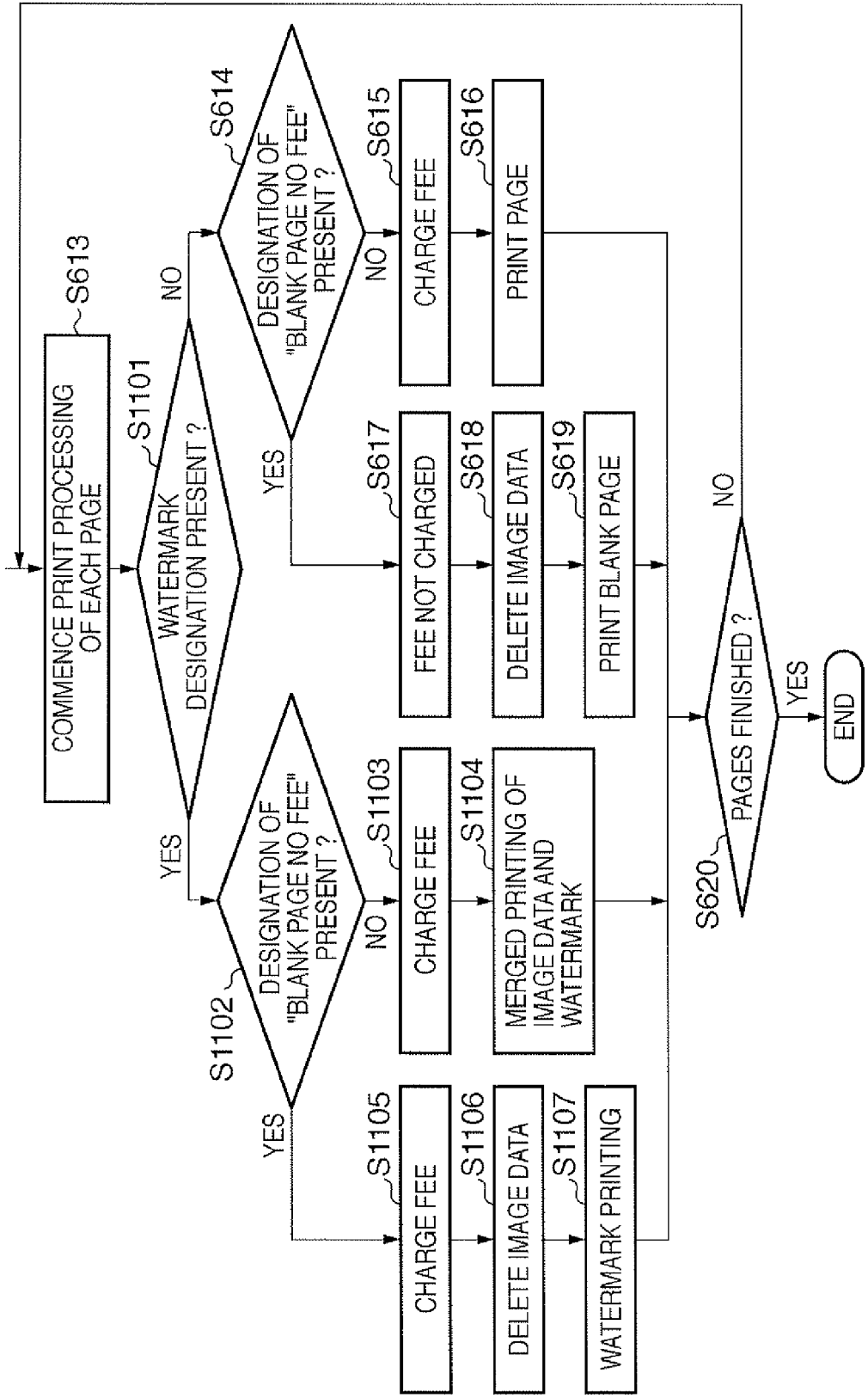
FIG. 11 is a flowchart showing a procedure of a process of the printing apparatus in the case where data designating watermark printing has been sent from a PC.

FIG. 11 is a flowchart showing a procedure of a process of the printing apparatus in the case where data designating watermark printing is received from the PC 101. The flowchart of FIG. 11 shows only the procedure of the processes from step S613 in FIG. 6B. That is, steps S601 to S612 shown in FIG. 6A and 6B are common in the first embodiment and the second embodiment. Furthermore, in FIG. 11, processes showing the same step number as FIGS. 6A and 6B are equivalent to the processes described with reference to FIGS. 6A and 6B.

In step S613, when the print data is generated, the charging control unit 211 launches and commences print processing of the pages.

In step S1101, a determination is performed as to whether or not there is a watermark designation. Here, a determination is performed for each page as to whether or not there is a watermark designation, but an embodiment is possible in which at determination is performed in advance as to whether or not there is a watermark designation for all the pages. When it is determined in step S1101 that there is a watermark designation, at determination is performed in step S1102 as to whether or not there is a designation of "blank page no fee" in the page of the print data to be printed.

When it is determined in step S1102 that there is no designation of "blank page no fee" in the relevant page, the procedure proceeds to step S1103 and the charging counter 212 is increased. After this, in step S1104, the watermark merging unit 901 merges the watermark (image data) with the image data of the relevant page and printing is carried out by the printer engine 118.

When it is determined in step S1102 that there is a designation of "blank page no fee" in the relevant page, the procedure proceeds to step S1105 and the charging counter 212 is increased. Then, in step S1106, the image data of the relevant page is cleared. After this, in step S1107, the watermark merging unit 901 merges the watermark (image data) and printing is carried out by the printer engine 118.

It should be noted that the processing between step S614 and step S620 is common with those in FIG. 6B and therefore a description is omitted here.

It should be noted that in the present embodiment, image data based on the specified form data is added as the watermark immediately before print processing in the engine. However, the timing for merging the watermark as print data may be in step S612 for example. In either case, when there is a watermark designation, the watermark is printed even when the print data to be merged undergoes clearing of image data according to the designation of "blank page no fee," and therefore the processing of charging a fee for printing the watermark should be carried out.

FIG. 12 is a diagram for describing a result according to the second embodiment. As shown in FIG. 12, a conventional case is shown at the upper level, which is compared to a case according to the present embodiment at the lower level.

Here, a watermark column shows a watermark that is registered in the PDL data from the PC 101 or registered by the scanner. Furthermore, a print data column shows print data such as print data generated based on the PDL data, print data that has been read in from the scanner 117, and print data that has been specified from the BOX. A printed result column shows results of merging and printing the watermark shown in the watermark column on the print data shown in the print data column.

As shown in FIG. 12, with the conventional technique, when a designation of "blank page no fee" is present in the second page of the print data, that command becomes valid and the second page become a blank page and the watermark is not printed. However, with the present embodiment, in the case where it is determined that a designation of watermark printing is present, the watermark is merged after the image data has been cleared, and printing is performed. Accordingly, it does not happen that the watermark is cleared and a blank page is output as happens conventionally. Further still, with the present embodiment, a fee is charged in the case where a watermark has been printed.

The present invention includes a case of having an operating system (OS) or the like that runs on a computer carry out a part or all of the actual processing according to instructions of a program (printing program) code such that the functionality of the foregoing embodiments is achieved by the processing thereof. Further still, the present invention can also be applied in the case where the program code read out from a storage medium is written onto a memory provided in an extension card inserted into the computer or an extension unit connected to the computer. In this case, a CPU or the like provided in the extension card or extension unit may carry out a part or all of the actual processing according to instructions of the program code that has been written in such that the functionality of the foregoing embodiments is achieved by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130094, filed May 16, 2008, which is hereby incorporated by reference herein in its entirety.

What is claimed is:

1. A printing apparatus that prints merged data in which print data and form data have been merged, the apparatus comprising:
    an analysis unit configured to analyze whether or not each page in the form data has been given a designation of blank page printing;
    a processing unit configured to carry out a process, based on a result of analysis by the analysis unit, of invalidating the designation of blank page printing of a page that has been given the designation of blank page printing in the form data;
    a merging unit configured to merge the form data processed by the processing unit and the print data, and
    a print unit configured to perform printing of the merged data that has been merged by the merging unit,
    wherein, in a case where a setting for printing the form data only has been set, the process of invalidating the designation of blank page printing by the processing unit is not carried out.

2. The printing apparatus according to claim 1, wherein when a page that has been given the designation of blank page printing is contained in the print data, the print unit discharges a blank page without carrying out printing of an image of that page.

3. The printing apparatus according to claim 1, wherein no fee based on print processing of the printing apparatus is charged for a page having the designation of blank page printing.

4. The printing apparatus according to claim 1,
    wherein the setting for printing the form data only is a setting of form merging printing which is carried out on a preprinted sheet.

5. The printing apparatus according to claim 1,
    wherein when a setting has been set so that a specific image is to be printed on all pages of the print data,
    the print unit prints only the specific image on a page that has been given the designation of blank page printing in the print data.

6. The printing apparatus according to claim 5,
    wherein when a setting has been set so that a specific image is to be printed on all pages of the print data, and the print unit prints only the specific image on the page that has been given the designation of blank page printing in the print data,
    a fee based on print processing of the printing apparatus is charged for the page that has been given the designation of blank page printing in the print data.

7. A printing method executed in a printing apparatus that prints merged data in which print data and form data have been merged, the method comprising the steps of:
    analyzing whether or not each page in the form data has been given a designation of blank page printing;
    carrying out a process, based on a result of analysis in the analysis step, of invalidating the designation of blank page printing of a page that has been given the designation of blank page printing in the form data;

merging the form data processed in the processing step and the print data, and performing printing of the merged data that has been merged by the merging in the merging step, wherein, in a case where a setting for printing the form data only has been set, the process of invalidating the designation of blank page printing in the processing step is not carried out.

8. The printing method according to claim 7, wherein when a page that has been given the designation of blank page printing is contained in the print data, the printing step involves discharging a blank page without carrying out printing of an image of that page.

9. The printing method according to claim 7, wherein no fee based on print processing of the printing apparatus is charged for a page having the designation of blank page printing.

10. The printing method according to claim 7, wherein the setting for printing the form data only is a setting of form merging printing which is carried out on a preprinted sheet.

11. The printing method according to claim 7, wherein when a setting has been set so that a specific image is to be printed on all pages of the print data, the printing step involves printing only the specific image on a page that has been given the designation of blank page printing in the print data.

12. The printing method according to claim 11, wherein when a setting has been set so that a specific image is to be printed on all pages of the print data, and only the specific image is printed in the printing step on the page that has been given the designation of blank page printing in the print data, a fee based on print processing of the printing apparatus is charged for the page that has been given the designation of blank page printing in the print data.

13. A non-transitory computer-readable storage medium on which is stored a printing program executed in a printing apparatus for printing merged data in which print data and form data have been merged, the program causing a computer to function so as to:

analyze whether or not each page in the form data has been given a designation of blank page printing;

carry out a process, based on a result of the analysis, of invalidating the designation of blank page printing of a page that has been given the designation of blank page printing in the form data;

merge the form data that has undergone the process and the print data, and print merged data that has been merged by the merging, wherein, in a case where a setting for printing the form data only has been set, the process of invalidating the designation of blank page printing is not carried out.

14. The medium according to claim 13, wherein when a page that has been given the designation of blank page printing is contained in the print data, a blank page is discharged without carrying out printing of an image of that page.

15. The medium according to claim 13, wherein no fee based on print processing of the printing apparatus is charged for a page having the designation of blank page printing.

16. The medium according to claim 13, wherein the setting for printing the form data only is a setting of form merging printing which is carried out on a preprinted sheet.

17. The medium according to claim 13, wherein when a setting has been set so that a specific image is to be printed on all pages of the print data, only the specific image is printed on a page that has been given the designation of blank page printing in the print data.

18. The medium according to claim 17, wherein when a setting has been set so that a specific image is to be printed on all pages of the print data, and only the specific image is printed on the page that has been given the designation of blank page printing in the print data, a fee based on print processing of the printing apparatus is charged for the page that has been given the designation of blank page printing in the print data.

* * * * *